W. D. SIMPSON.
NUT MARKING MACHINE.
APPLICATION FILED JULY 22, 1919.
1,344,007.
Patented June 22, 1920.
5 SHEETS—SHEET 1.
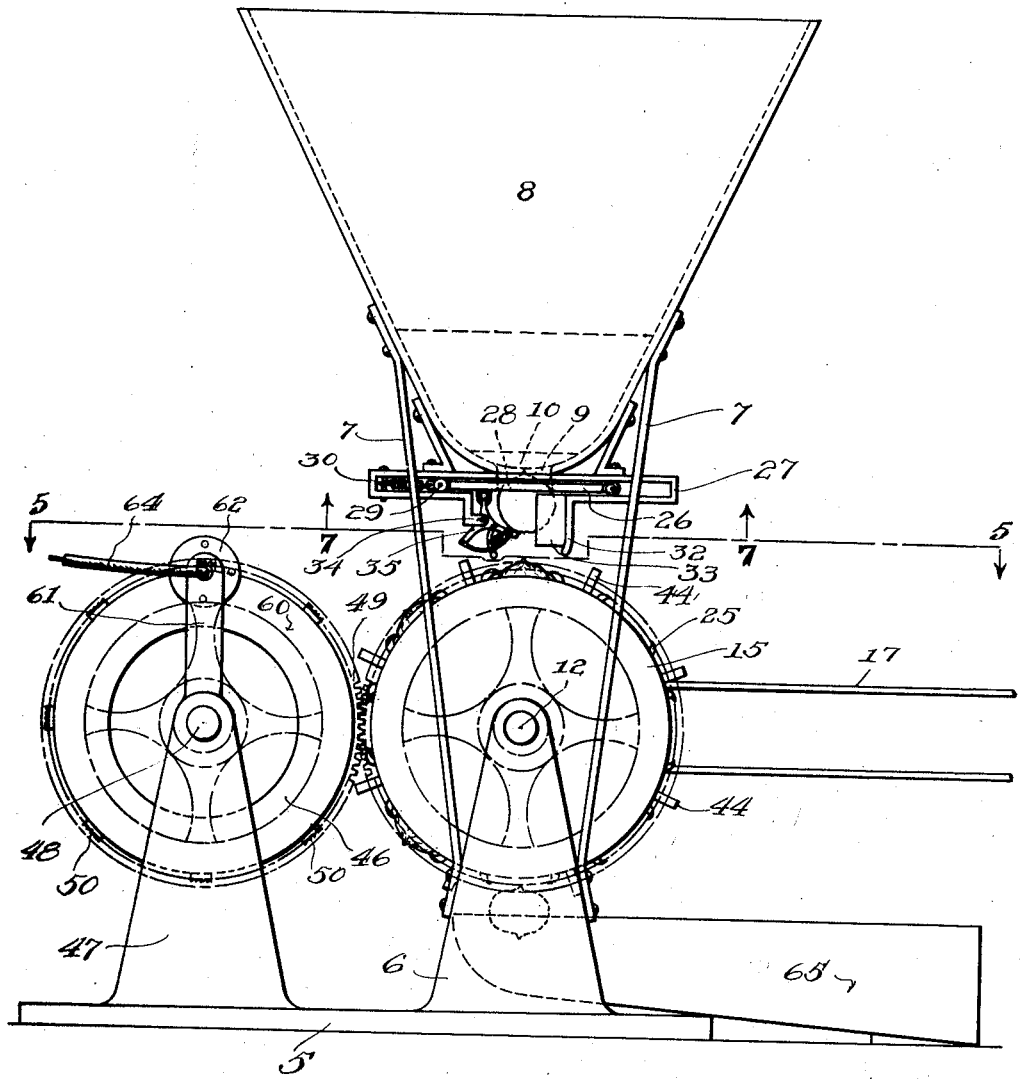
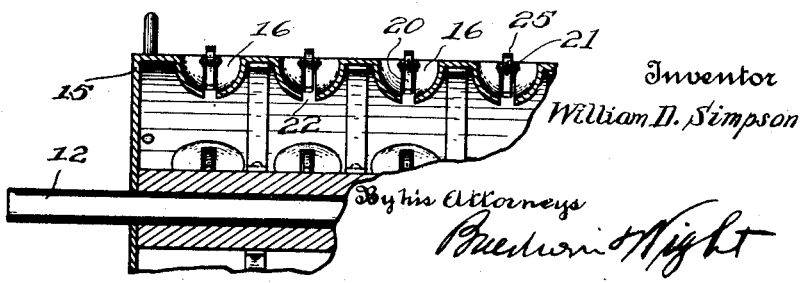

W. D. SIMPSON.
NUT MARKING MACHINE.
APPLICATION FILED JULY 22, 1919.
1,344,007.
Patented June 22, 1920.
5 SHEETS—SHEET 2.
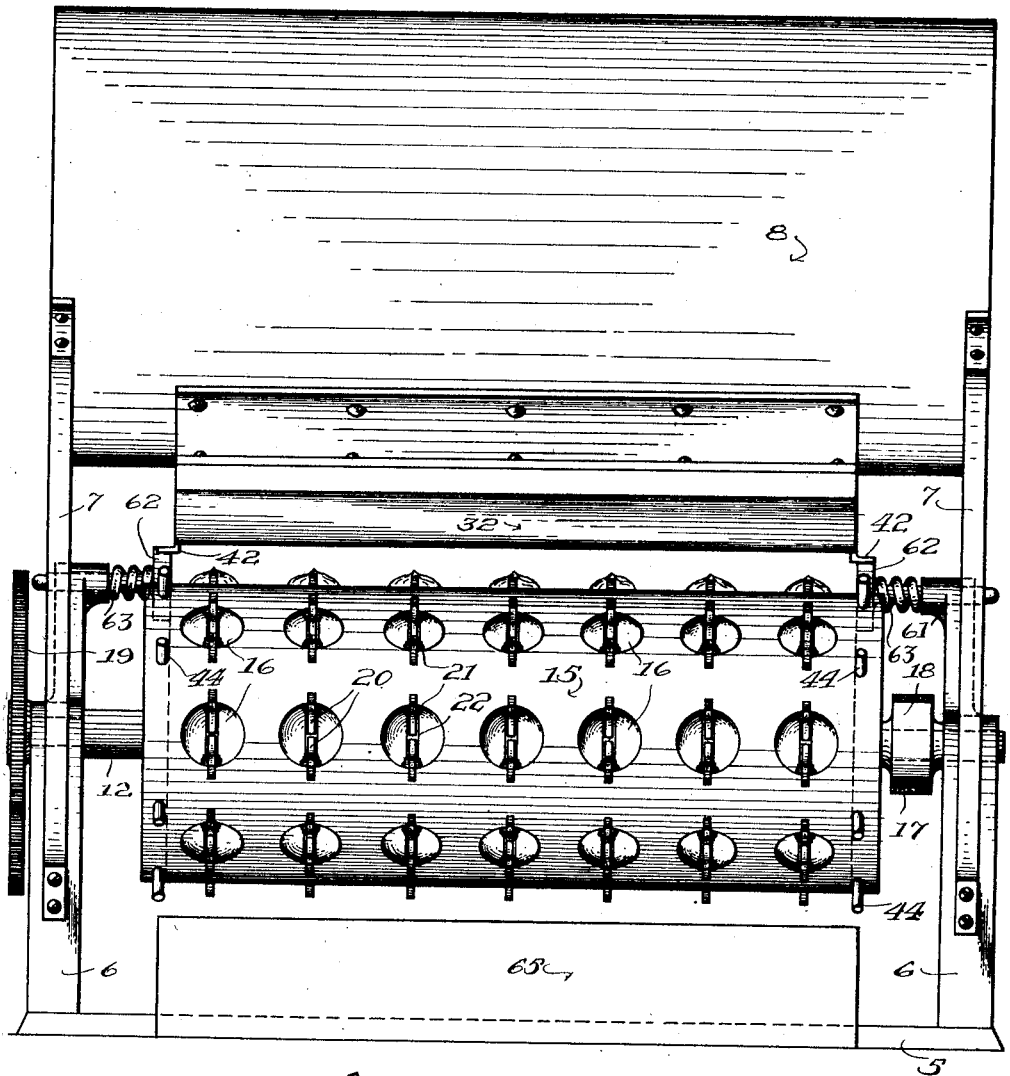
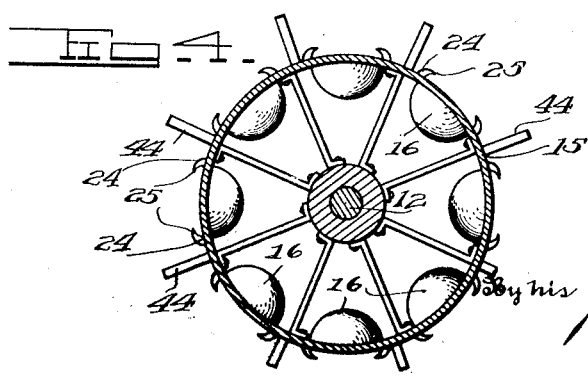
Inventor
William D. Simpson
By his Attorneys
Baldwin Wight

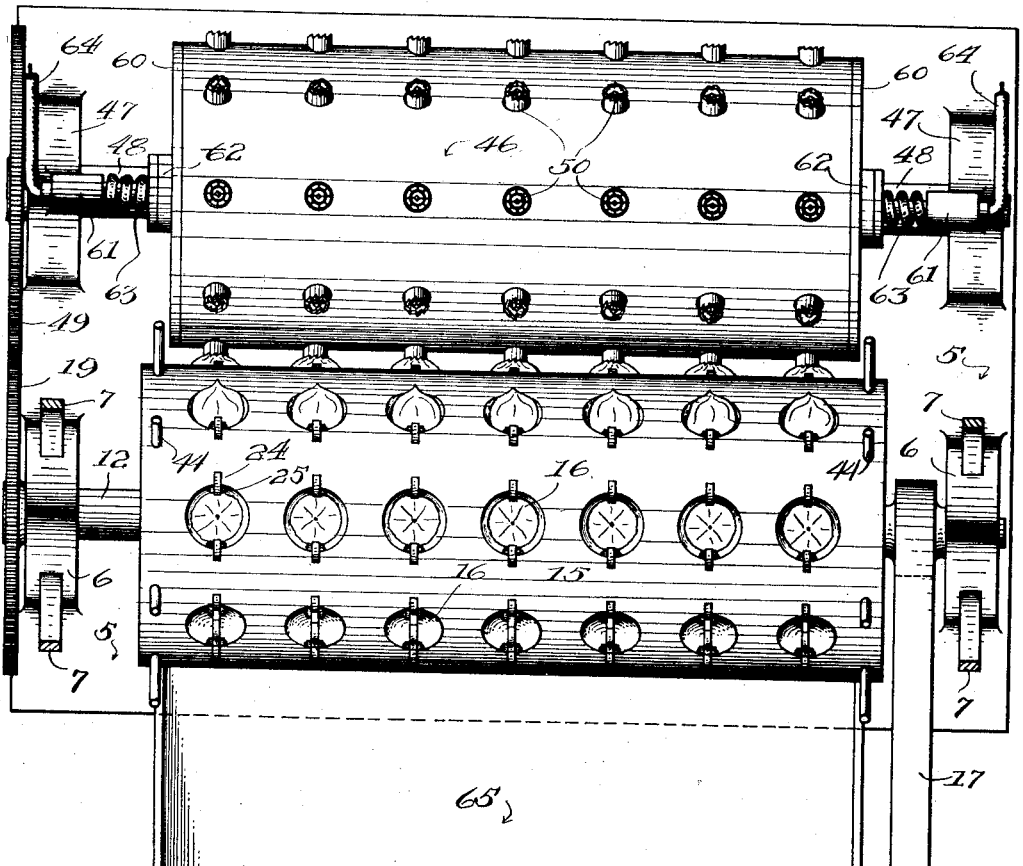

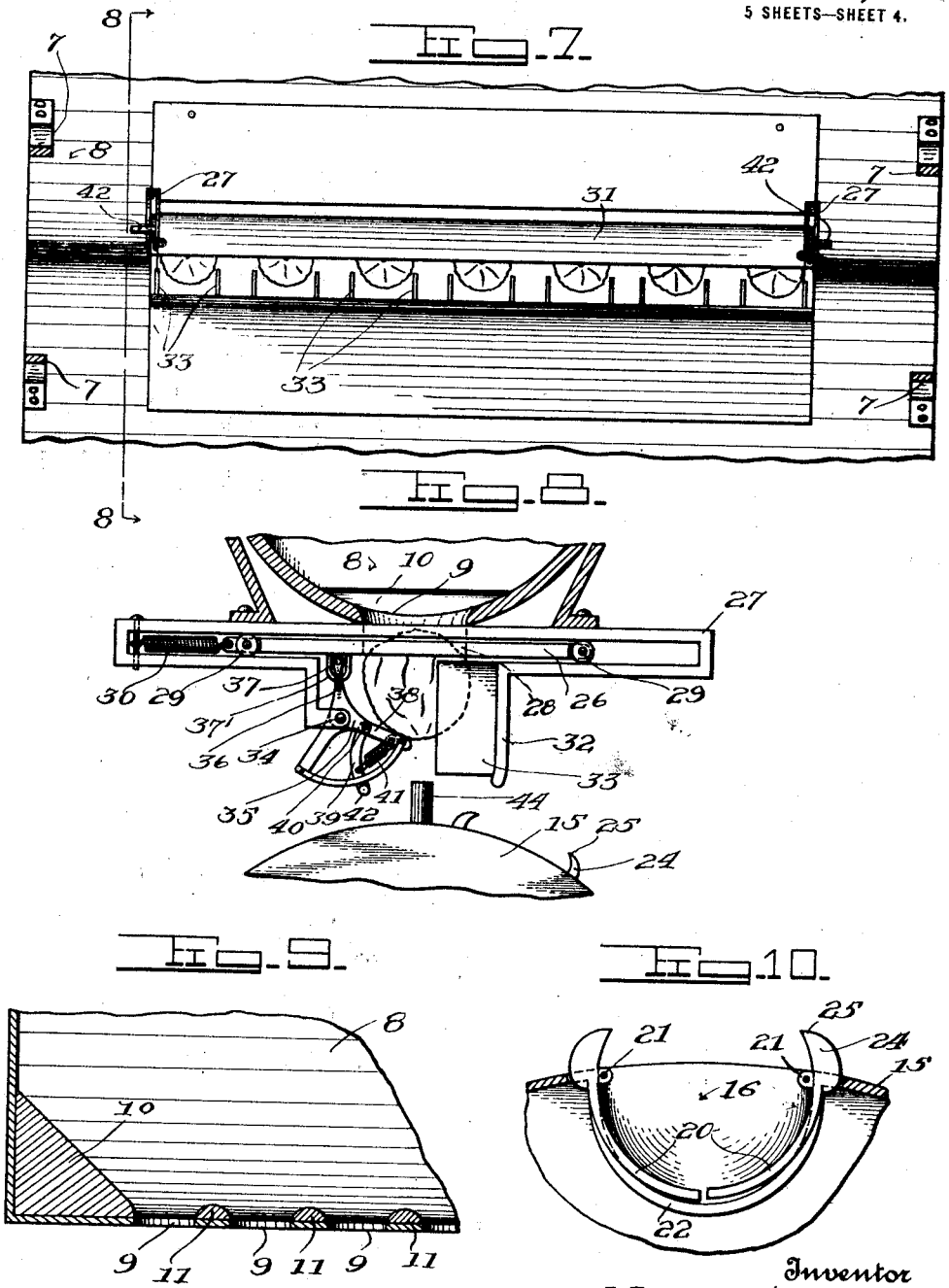

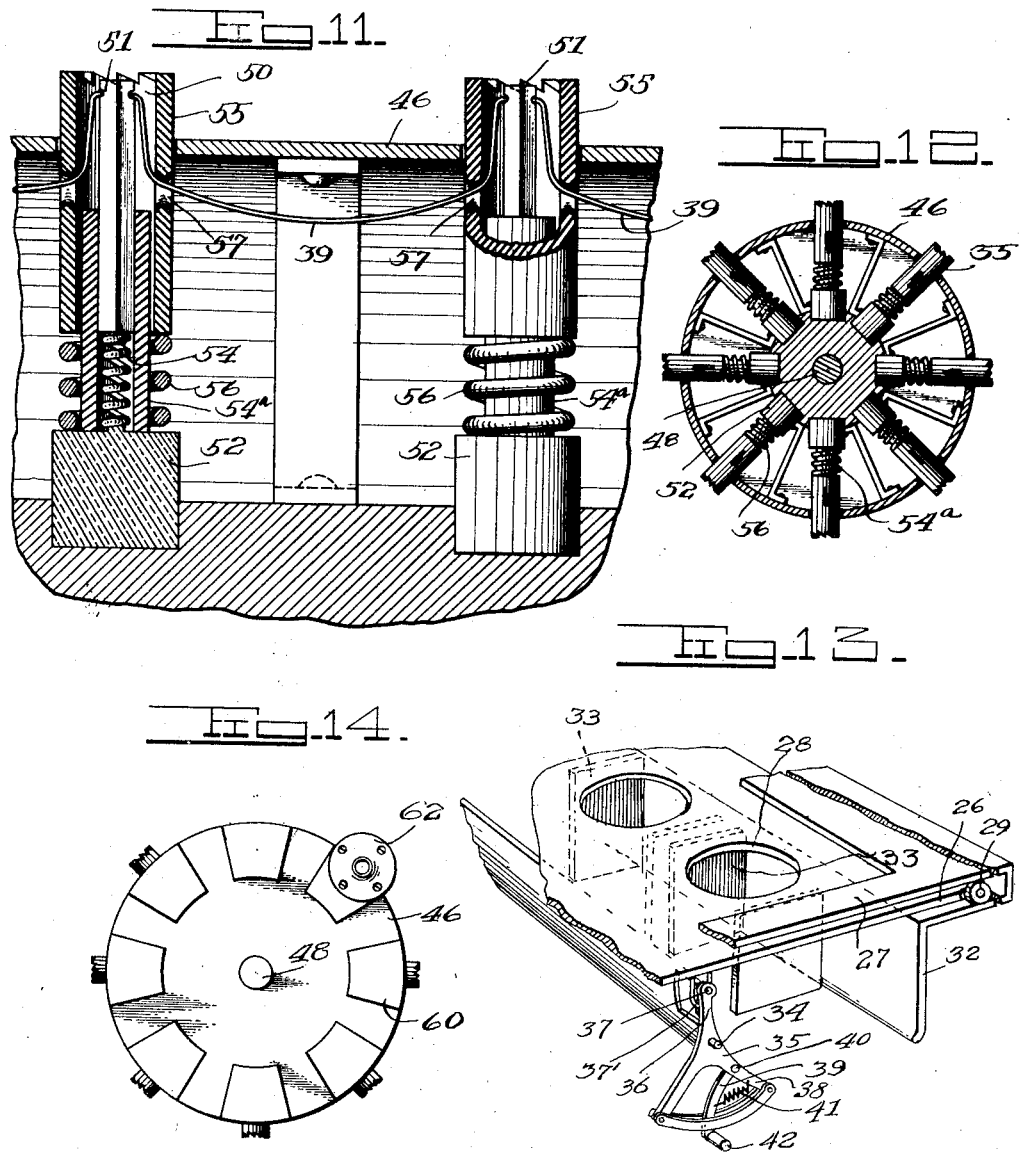

UNITED STATES PATENT OFFICE.

WILLIAM D. SIMPSON, OF COLUMBIA, SOUTH CAROLINA.

NUT-MARKING MACHINE.

1,344,007.  Specification of Letters Patent.  Patented June 22, 1920.

Application filed July 22, 1919. Serial No. 312,480.

*To all whom it may concern:*

Be it known that I, WILLIAM D. SIMPSON, a citizen of the United States, residing at Columbia, county of Richland, and State of South Carolina, have invented a new and useful Improvement in Nut-Marking Machines, of which the following is a specification.

My invention relates to machines for branding or otherwise suitably marking walnuts or other similar articles with a trade-mark or other like distinguishing character.

The object of my invention is to provide a machine of this kind in which a large number of nuts or the like may be quickly marked.

A further object of my invention is to provide a suitable feeding and handling mechanism whereby a large number of nuts may be operated on simultaneously without danger of crushing or otherwise mutilating them.

A further object is to provide a machine of this kind in which provision is made for marking all of the nuts irrespective of variations in the size of the nuts being operated upon.

In carrying out my invention I prefer to use a comparatively wide hopper having a row of openings extending along the bottom thereof throughout the greater portion of its width. Positioned beneath the openings is a carrier, preferably comprising a horizontally rotating drum or cylinder having rows of nut-receiving recesses in its periphery and provided with means operated by the weight of the nuts for holding the nuts until the same have been marked. Across the row of feed openings in the hopper I prefer to employ a slide operated intermittently to automatically feed nuts into the carrier when the recesses are properly positioned beneath the hopper, thereby insuring the delivery of only sufficient nuts to properly fill up the recesses. The nuts are then moved by means of the carrier into engagement with a row of marking or branding devices positioned opposite the nut-receiving recesses whereby the nuts may be marked. I prefer to employ electrically heated branding irons, the branding irons being yieldably supported in order to operate upon nuts of varying sizes. Upon further movement of the carrier the nuts so marked are automatically released from the recesses.

While I describe my invention as being used particularly in connection with walnuts, it is obvious that it may also be used to operate upon other similar articles.

Referring more particularly to the drawings:

Figure 1 shows a side elevation of my invention.

Fig. 2 shows a broken section longitudinally through the carrier drum.

Fig. 3 shows an end elevation of the machine.

Fig. 4 represents a transverse section of the carrier drum.

Fig. 5 shows a section on the line 5—5 of Fig. 1 showing a plan view of the carrying drum and the marking devices.

Fig. 6 shows a broken section longitudinally through the marking devices.

Fig. 7 represents a section on the line 7—7 of Fig. 1 showing the under side of the hopper and feeding mechanism.

Fig. 8 shows an enlarged section on the line 8—8 of Fig. 7.

Fig. 9 shows in detail a portion of the interior of the hopper.

Fig. 10 shows a nut-receiving recess in section.

Fig. 11 represents an enlarged section showing the construction of the marking devices.

Fig. 12 shows a transverse section through the drum in which the marking devices are supported.

Fig. 13 shows a detail perspective of a portion of the nut-feeding mechanism.

Fig. 14 represents a modification for controlling the circuits to the electrically heated marking devices.

In the drawings 5 indicates a base having vertical standards 6 thereon. Supported above the base by means of braces 7 is a nut-receiving hopper 8, the hopper extending substantially the width of the base. A row of openings 9 is provided at the bottom of the hopper throughout the greater portion of its width and in order to direct the nuts into the openings the ends of the hopper are preferably provided with inclined fillers 10 and the portions of the bottom between the openings are rounded on top as indicated at 11.

Supported in suitable bearings in the standards 6 is a shaft 12, to which is secured a nut-carrying drum 15 having a plurality of rows of nut-receiving cups or recesses 16 extending across its periphery, the number of recesses in each row corresponding to the number of feed openings 9 in the bottom of the hopper. The drum may be driven by any preferred means, such as a belt 17 engaging a pulley 18 keyed to one end of the shaft. Keyed to the opposite end of the shaft is a gear 19 for the purpose hereinafter more fully described.

Each nut-receiving recess 16 in the drum 15 is provided with a nut-holding means comprising a pair of lever arms 20 pivoted at 21 and moving in slots 22 in the nut-receiving recesses, the arms preferably being so curved as to conform with the walls of the recesses (see Fig. 10). On the outer ends of the arms 20 are weighted portions 24 preferably projecting beyond the periphery of the drum and having nut-engaging points 25 on their extremities. By means of this construction, the weight of a nut in the recess will push down on arms 20 causing them to rock in the slots 22 and swing the points 25 into engagement with the shell of the nut, thereby holding the nut against movement so long as the weight of the nut rests on the arms 20. When, however, the carrier is rotated to a position where the recesses are inverted, the weight of the nut will be against the portions 24, thereby disengaging points 25 and allowing the nut to drop.

For feeding the nuts from the hopper into the recesses in such a manner that but a single nut may fall into each recess, a slide 26 is mounted in guides 27 on each side of the hopper in such manner that it may be reciprocated across the openings 9 in the hopper, the slide being provided with openings 28 normally adapted to register with the openings 9. The slide is preferably provided with rollers 29 moving in the guideways 27 whereby it may be more easily operated. The springs 30 are secured to the guide frames 27 and to the slides for returning the slide to normal position after it has been moved out of position as hereinafter described. Pivoted to the guides 27 and extending substantially the entire width between them, is a curved plate 31 for retaining the nuts after they drop through the openings 28 in the slide, the curved plate normally coöperating with a stationary guide plate 32 provided with a pair of spaced partitions 33 beneath each opening 28, thereby insuring of the nuts being held in proper position over the nut-receiving recesses 16. Having a common pivot 34 with the curved plate 31 are cranks 35 having one arm 36 provided with a pin 37 engaging yokes 37' on the under side of the slide. The opposite arm 38 of each crank is provided with a depending lever 39 pivoted at 40 and retained in normal position by means of the stiff coil spring 41. On the lower end of each lever 39 is a laterally extending lug 42.

On each end of the carrying drum 15, and slightly in advance of each row of nut-receiving recesses are placed pins 44 projecting beyond the periphery of the drum and positioned so that during rotation of the drum these pins 44 are successively brought into engagement with lugs 42 on the levers 39.

In operation, nuts falling through the registered openings 9 and 28 are caught on the curved plate 31 and held in position by partitions 33 on the guide plate 32. Upon the rotation of the carrier drum 15 pins 44 are brought into engagement with lugs 42 on the levers 39. The spring 41 is stiff enough so that it does not ordinarily function, and the crank 35 is accordingly rocked on its pivot 34 by the movement of the pins 44. This motion of the crank serves to move the curved plate 31 away from the guide plate 32 whereby the nuts are allowed to roll from the curved plate into the nut-receiving recesses 16, the nuts being guided into the recesses by the partitions 33. By means of the pin and yoke connection to the sliding plate the movement of the crank 35 also serves to slide the plate 26 longitudinally of the machine to move the openings 28 out of register with the openings 9, thus preventing more than a single nut being delivered through each opening at a time. Should the nuts become jammed or otherwise caught in the openings 9 or 28 to prevent the movement of the slide or to cause the nuts to be crushed should the slide be moved, the spring 41 will permit the lever 39 to be moved by the pins 44 on the drum but without rocking the crank 35.

According to my invention the carrier drum is continuously rotated and the nuts after falling into the nut-receiving recesses are carried opposite a suitable marking device. For marking the nuts I prefer to use a drum 45 supported in a pair of standards 47 on the base 5, the drum being carried on a shaft 48 to which is secured a gear 49 meshing with gear 19 on the shaft 12 whereby the two drums may be rotated in synchronism. Carried by the drum 46 are a plurality of rows of marking devices 50. The number of marking devices in each row corresponds to the number of nut-receiving recesses 16 in a single row on the drum 15 and are so positioned that each marking device may be brought opposite a nut-receiving recess, the gearing being so timed that a row of markers is presented opposite each row of recesses in succession.

The marking devices preferably comprise an electrically heated die 51 yieldingly supported on a heat insulating base 52 by means of a spring 54 contained within a heat insulating tube 54ª. Surrounding each die is a heat insulating jacket 55 yieldingly carried on the spring 56, the outward extremities of the jacket preferably being roughened or toothed to engage the nut during the branding operation to assist in holding it against movement. The slots 57 are preferably provided in the insulators 55 through which pass electric conductors 59, the slots permitting of the relative movements of the die and insulating jacket without danger of injury to the conductors. By reason of the yielding action provided by the springs, nuts of varying sizes and shapes may be successfully operated upon.

The electrically heated dies may be connected to a source of electric current in any well known manner, but I prefer to connect a single row of dies in series, as indicated in Fig. 11, the opposite ends of the wires being then connected to contact plates 60 on the end of the drum. These plates may be annular or they may be in the form of segments, one segment being provided for each row of dies, as shown in the modification in Fig. 14. Secured to the standards 47 are supports 61 on which are carried contact devices or brushes 62 adapted to be held in engagement with the contact plates 60 during the rotation of the drum 46. For insuring the flow of current across the brushes 62 and plates 60 a spring 63 is preferably provided to urge the brushes against the contacts. The brushes 62 are suitably connected with a source of electric current by conductors 64.

When the contact plates 60 are segmental, as indicated in the modification shown in Fig. 14, the brushes are preferably so placed that the row of dies next to be brought into operative position is being heated during the time that the preceding row on the drum is operating upon a row of nuts.

Placed beneath the nut-carrying drum 15 is a suitable receptacle such as a trough 65 into which the nuts may drop after being released from the carrier by gravity.

In operation nuts are put into the hopper 8 and the carrier drum rotated by means of the driving belt 17. Projecting pins 44 on the ends of the drum 15 engage lugs 42 on the levers 41 to operate the feeding mechanism in the matter hereinbefore described to permit a nut to fall into each recess 16 in a row as the rows are presented in succession beneath the hopper. The weights of the nuts in each recess actuate the holding points 25 as hereinbefore described until after the rotation of the drum has presented the nuts to the marking devices 50 carried by the oppositely rotated drum 46. Upon further rotation of the carrier 15 to bring the nuts into inverted position the nut holding points 25 are released to permit the nuts to fall into the trough 65.

While I have described the preferred form of my invention, it will be obvious that changes may be made within the scope of the appended claims. Instead of using branding devices for marking the nuts, it is contemplated that stamps may be used, provision being made for inking the stamps by a third cylinder carrying an inking pad.

I claim as my invention:

1. A nut marking machine comprising a hopper for receiving nuts to be marked, a nut-receiving carrier adapted to receive a plurality of nuts at a time beneath said hopper, and means on said carrier for holding nuts, said means being controlled by the nuts, means in said hopper for delivering a plurality of nuts to the carrier at a time, means for marking the nuts, and means for moving the carrier to bring the nuts into contact with the marking means.

2. A nut marking machine comprising a hopper, a horizontally rotatable cylinder beneath said hopper, gravity operated nut-holding means in said cylinder adapted to clamp the nuts when the nut-holding means are substantially upright and to release the nuts when said means are inverted, means for feeding nuts from the hopper into the nut-receiving means, and marking devices for marking the nuts in said receiving means after they are moved from beneath the hopper.

3. A nut marking machine comprising a hopper, a horizontally rotatable cylinder beneath said hopper, nut-holding means in said cylinder adapted to clamp the nuts when the nut-holding means are substantially upright and to release the nuts when said means are inverted, means for feeding nuts from the hopper into the nut-receiving means, and marking devices for marking the nuts in said receiving means after they are moved from beneath the hopper, said marking devices being surrounded with means coöperating therewith for engaging the nuts to assist in holding them in the carrier during the marking operation.

4. A nut marking machine comprising a hopper having a row of openings therein, means for simultaneously dispensing nuts one at a time through each of the openings, a horizontally rotatable cylinder beneath the hopper, said cylinder having rows of nut-receiving recesses in its periphery, a common means for feeding a single nut into each nut-receiving recess in a row as each row is brought successively into position beneath the hopper, and rows of marking devices coöperating with said cylinder to present a marking device opposite each nut-receiving recess on the cylinder, the rows of marking devices being presented successively to the successive rows of nuts.

5. A nut marking machine comprising a hopper, a horizontally rotatable carrier drum beneath said hopper, said drum being provided with nut-receiving recesses in its periphery, arms pivoted in said recesses and having normally inoperative nut-engaging means therein, said nut-engaging means being adapted to move into gripping engagement with the nut by reason of the weight of a nut in the recess, means for feeding nuts from the hopper into the recesses, means for rotating the carrier drum, and marking devices coöperating with the drum for presenting a marking die opposite each recess after it moves from beneath the feeding means.

6. A nut marking machine comprising a hopper having a row of feed openings along its bottom, a nut-receiving carrier movable beneath said hopper, rows of nut-receiving means on said carrier, means controlled by the nuts in the receiving means for holding the nuts in position therein, feeding mechanism beneath said feed openings in the hopper for permitting but a single nut being fed from each opening at a time, means comprising a reciprocable slide operated by the carrier for reciprocating the slide, and marking devices adapted to be brought into contact with the nuts in the receiving means on the carrier.

7. A nut marking machine comprising a hopper having a row of feed openings along its bottom, a nut-receiving carrier movable beneath said hopper, rows of nut-receiving and holding means on said carrier, feeding mechanism beneath said feed openings in the hopper for permitting but a single nut being fed from each opening at a time, means for preventing said feeding means from functioning should a nut become caught therein, means operated by the carrier for operating the feeding mechanism, and marking devices adapted to be brought into contact with the nuts in the receiving means on the carrier.

8. A nut marking device comprising a hopper, nut-feeding means for said hopper, a nut-carrying drum rotatably supported beneath said hopper and provided with rows of nut-receiving devices on its periphery, a second drum adjacent the nut-carrying drum and having a plurality of rows of nut marking devices said marking devices projecting beyond its periphery, said second drum having its axis parallel to the axis of the nut carrying drum, means for operating both drums in synchronism whereby a row of marking devices may always be presented opposite a row of nut-receiving devices on the carrying drum, and means for dispensing nuts from the hopper, said means acting concomitantly with the rotation of the drum.

9. A nut marking device comprising a hopper having a transverse row of openings in the bottom thereof, nut-feeding means for feeding a single nut simultaneously from each opening in said hopper, a nut carrying drum rotatably supported beneath said hopper and provided with rows of cup-shaped nut-receiving devices on its periphery, a second drum adjacent the nut-carrying drum and having a plurality of rows of electrically heated nut marking devices having heat insulating means around them, the nut marking devices projecting beyond the periphery of the drum, and means for operating both drums in synchronism whereby a row of marking devices may always be presented opposite a row of nut-receiving devices on the carrying drum.

10. A nut marking machine comprising a hopper, nut-feeding means for said hopper, a nut-carrying drum rotatably carried beneath said hopper and provided with rows of nut-receiving devices on its periphery, a second drum adjacent the nut-carrying drum and having a plurality of rows of electrically heated yieldingly supported nut marking devices projecting beyond its periphery, said nut marking devices having yieldingly supported heat insulating jackets around them, and means for operating both drums in synchronism whereby a row of marking devices will always be presented opposite a row of nut-receiving devices on the carrying drum.

11. A nut marking device comprising a hopper, a nut-carrying drum rotatable beneath said hopper, means for feeding nuts from the hopper to the drum, nut-receiving means on said drum, nut-holding means actuated by the weight of the nuts adapted to clamp the nuts until the nuts are carried to inverted position by rotation of the drum, marking devices for marking the nuts while they are clamped in the nut-receiving means, and means for collecting the nuts after they are released from the nut-holding means.

In testimony whereof I have hereunto subscribed my name.

WILLIAM D. SIMPSON.